Sept. 23, 1924.  
W. G. COX  
1,509,394  
VEHICLE BUMPER  
Filed Aug. 14, 1922
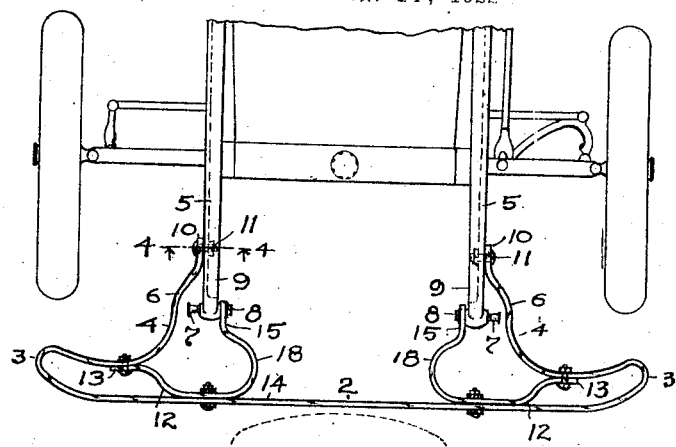
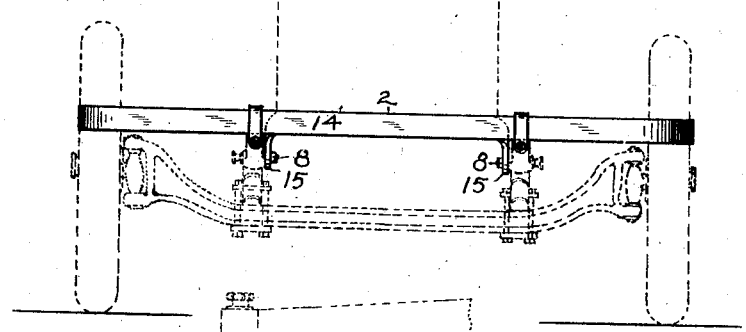
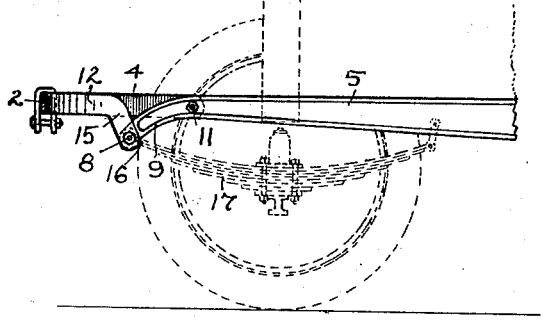
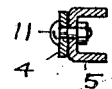
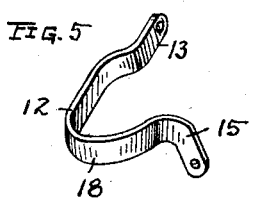
Inventor  
W. G. COX.

Patented Sept. 23, 1924.

1,509,394

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

VEHICLE BUMPER.

Application filed August 14, 1922. Serial No. 581,754.

*To all whom it may concern:*

Be it known that I, WILLIAM G. COX, a citizen of the United States, residing at Cleveland, in the county of Cuyahoga and State of Ohio, have invented certain new and useful Improvements in a Vehicle Bumper, of which the following is a specification.

My invention appertains to an improvement in a spring bumper for automobiles, and my object is to provide a bumper in which supplemental spring bars are introduced between reversely-bent spring loop ends of the bumper and fastened to the shackle bolts for the suspension springs of the car, so as to facilitate the attachment of the bumper to the car and also more uniformly distribute and absorb any impact and shock delivered upon either end of the bumper.

In the accompanying drawing Fig. 1 is a top view of my improved bumper attached to the front end of an automobile, and Fig. 2 is a front view of the same. Fig. 3 is a side view of the bumper mounted upon the car, and Fig. 4 is a cross section on line 4—4 of Fig. 1. Fig. 5 is a perspective view of one of the supplemental spring bars.

The bumper comprises a flat bar 2 of spring metal which is reversely bent on curved lines at its opposite ends to provide rounded impact-receiving extremities 3 and rearwardly-curved supporting arms 4 adapted to be attached to the side channels 5 of the chassis frame of the car. Thus each arm 4 is rounded and offset at 6 to avoid the oil cup 7 for the shackle bolt 8 at the curved horn 9 of the chassis frame, and the extreme ends 10 are brought nearer together for flat seating engagement with the outer flat sides of the channel 5 where a fixed attachment is made by a single bolt 11. Obviously this bolt alone would not suffice to support the bumper at a fixed elevation in front of the car, and in order to obtain the needed additional support and to promote attachment of the bumper without the aid of other bolts or parts than those found on the car I provide a separate spring bar 12 for each end of the main bumper bar and bend this supplemental bar at one end on compound curved lines to permit its outer flat end 13 to be bolted, riveted or clamped to the inside face of the curved arm 4 a short distance back from the rounded extremity 3. This strengthens the loop end of the bumper, and the straight impact portion 14 of the main bumper bar is also backed up and sustained by the supplemental bar 12 where engaged with it for a short distance directly in front of horn 9. The inner end 15 of supplemental bar 12 is supported and fastened by the same nut and bolt 8 which is commonly used to pivotally secure the shackles 16 of the suspension springs 17 to the horn end of the frame, and in order that the supplemental bar may be flexible or springy the inner rearwardly extending portion 18 of this bar is bent into a semi-circle. The straight flat inner end 15 is also bent or curved downwardly, see Fig. 3, to permit it to be attached to the frame by shackle bolt 8 the requisite distance above the ground and at the proper elevation in respect to the front end of the car.

What I claim is:

1. A spring bumper for an automobile, comprising a main bar having its opposite ends bent reversely into spring loop portions and relatively long curved attachment arms, and an arched spring bar at each end of said main bar having its middle portion bearing against the back of said main bar and its outer end bearing against the rear portion of the adjacent loop and its inner end portion curved rearwardly and bent downwardly to permit attachment of the spring shackle bolt.

2. A spring bumper for an automobile, comprising a main impact bar having spring loop portions at its opposite ends terminating in curved arms having laterally-offset extremities, and each loop end of said main bar having a resilient spring bar engaged at its inner end therewith and connected between its ends with said main bar and curved rearwardly to provide a spring portion and bent downwardly at its inner end to permit attachment to the spring shackle bolt, said downwardly bent inner end having a bolt-opening therein.

In testimony whereof I affix my signature.

WILLIAM G. COX.